(12) United States Patent
Yim

(10) Patent No.: US 9,545,085 B1
(45) Date of Patent: Jan. 17, 2017

(54) CORAL PROPAGATION HOLDER WITH ADJUSTABLE SHELVES

(71) Applicant: Steven Yim, La Habra, CA (US)

(72) Inventor: Steven Yim, La Habra, CA (US)

( * ) Notice: Subject to any disclaimer, the term of this patent is extended or adjusted under 35 U.S.C. 154(b) by 0 days.

(21) Appl. No.: 14/837,972

(22) Filed: Aug. 27, 2015

(51) Int. Cl.
*F16B 1/00* (2006.01)
*A01K 63/00* (2006.01)
*F16M 13/02* (2006.01)

(52) U.S. Cl.
CPC ............. *A01K 63/006* (2013.01); *F16B 1/00* (2013.01); *F16M 13/02* (2013.01); *F16B 2001/0035* (2013.01)

(58) Field of Classification Search
CPC ....... A01K 61/006; A01K 63/006; F16B 1/00; F16M 13/02
USPC .................. 119/246, 247, 248, 253, 256, 269
See application file for complete search history.

(56) References Cited

U.S. PATENT DOCUMENTS

| | | | | |
|---|---|---|---|---|
| 4,165,711 A | * | 8/1979 | Aoki | E02B 3/046 119/221 |
| 4,316,431 A | * | 2/1982 | Kimura | A01K 61/006 119/221 |
| 4,993,362 A | * | 2/1991 | Jimbo | A01K 61/006 119/221 |
| 5,564,369 A | * | 10/1996 | Barber | A01K 61/006 119/221 |
| 5,690,053 A | | 11/1997 | Strange, Jr. | |
| 6,089,191 A | * | 7/2000 | Calinski | A01K 61/006 119/208 |
| 6,564,748 B1 | * | 5/2003 | Olsson | A01K 63/006 119/269 |
| 6,896,445 B1 | * | 5/2005 | Engler | E02B 3/046 405/21 |
| 2005/0022749 A1 | | 2/2005 | Amblard | |
| 2005/0039391 A1 | * | 2/2005 | Morse | A47G 7/041 47/39 |

(Continued)

FOREIGN PATENT DOCUMENTS

CN       101806693 A       8/2010
CN       203555049 U       4/2014

(Continued)

OTHER PUBLICATIONS

Machine Transaltion of CN203555049, Description printed on epacenet, on Sep. 6, 2015.*

*Primary Examiner* — Joshua Rodden
*Assistant Examiner* — Kimberley S Wright
(74) *Attorney, Agent, or Firm* — Kenneth L. Green; Averill & Green

(57) ABSTRACT

A coral holder resides in an aquarium and includes shelves with holes which accept coral plugs. The coral plugs are small round tables with cylindrical stems extending down from the table. Hobbyist take adult size living corals and "frag" them (i.e., cut the mother colony and break off a small section) and glue the coral fragments to the coral plugs. The coral plugs are inserted into the holes on the shelves providing a coral display. The holder includes a center section, a fixed top shelf and adjustable shelves. The adjustable shelves extend out sides and front of the center section and are adjustable allowing the aquarium owner to adjust the adjustable shelves accordingly to their needs (i.e., for the number of coral plugs). The positions of the shelves are fixed by inserting the coral plugs through the fixed top shelf and through the adjustable shelves.

11 Claims, 7 Drawing Sheets

(56) References Cited

U.S. PATENT DOCUMENTS

| | | | |
|---|---|---|---|
| 2005/0072368 A1* | 4/2005 | Hsiao | A01K 61/006 119/211 |
| 2005/0133423 A1* | 6/2005 | Olivier | A01K 63/04 210/167.22 |
| 2008/0006214 A1* | 1/2008 | Power | A01K 61/002 119/208 |
| 2008/0230010 A1* | 9/2008 | Buck | A01G 9/00 119/256 |
| 2009/0283051 A1* | 11/2009 | Metzler | A01K 61/006 119/221 |
| 2009/0320766 A1* | 12/2009 | Calinski | A01K 61/006 119/240 |
| 2011/0017144 A1* | 1/2011 | Calinski | A01K 61/002 119/200 |
| 2011/0250017 A1* | 10/2011 | Sung | A01G 33/00 405/25 |
| 2011/0314562 A1* | 12/2011 | Lu | A01K 67/033 800/4 |
| 2012/0096570 A1 | 4/2012 | Tran et al. | |
| 2013/0118413 A1* | 5/2013 | Bennett | A01K 61/006 119/200 |
| 2013/0284106 A1 | 10/2013 | Moewe | |
| 2015/0250134 A1* | 9/2015 | Hicks | A01K 1/03 119/246 |
| 2015/0250149 A1* | 9/2015 | Gronkowski | A01K 63/006 119/248 |
| 2016/0044899 A1* | 2/2016 | Bartkowski | A01K 61/006 405/31 |

FOREIGN PATENT DOCUMENTS

| | | |
|---|---|---|
| JP | 6-169666 | 6/1994 |
| JP | 6-303875 | 11/1994 |

* cited by examiner

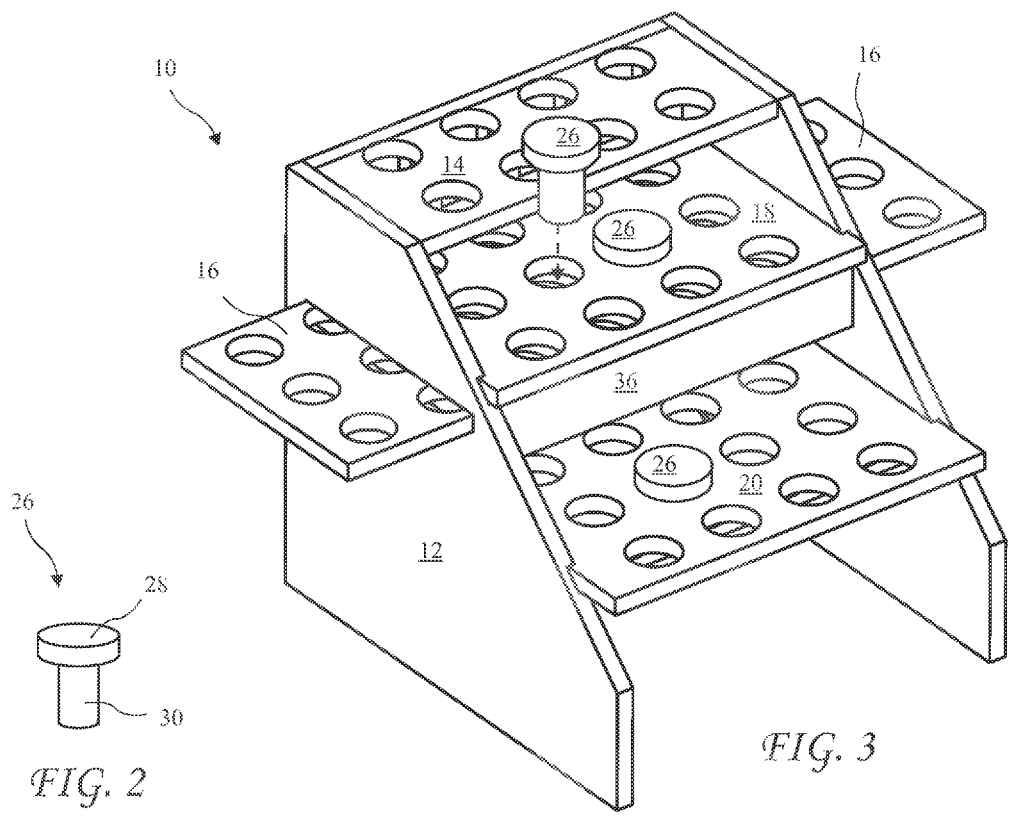
FIG. 2
FIG. 3
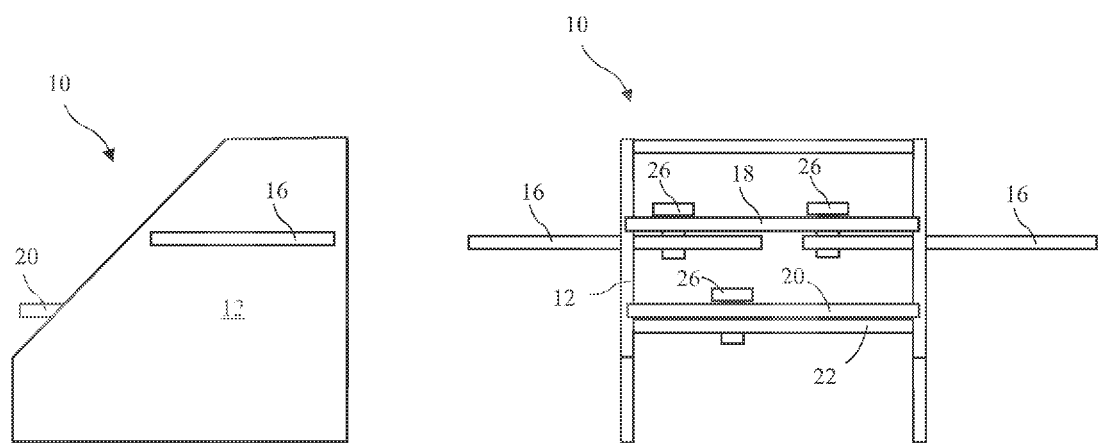
FIG. 4A
FIG. 4B

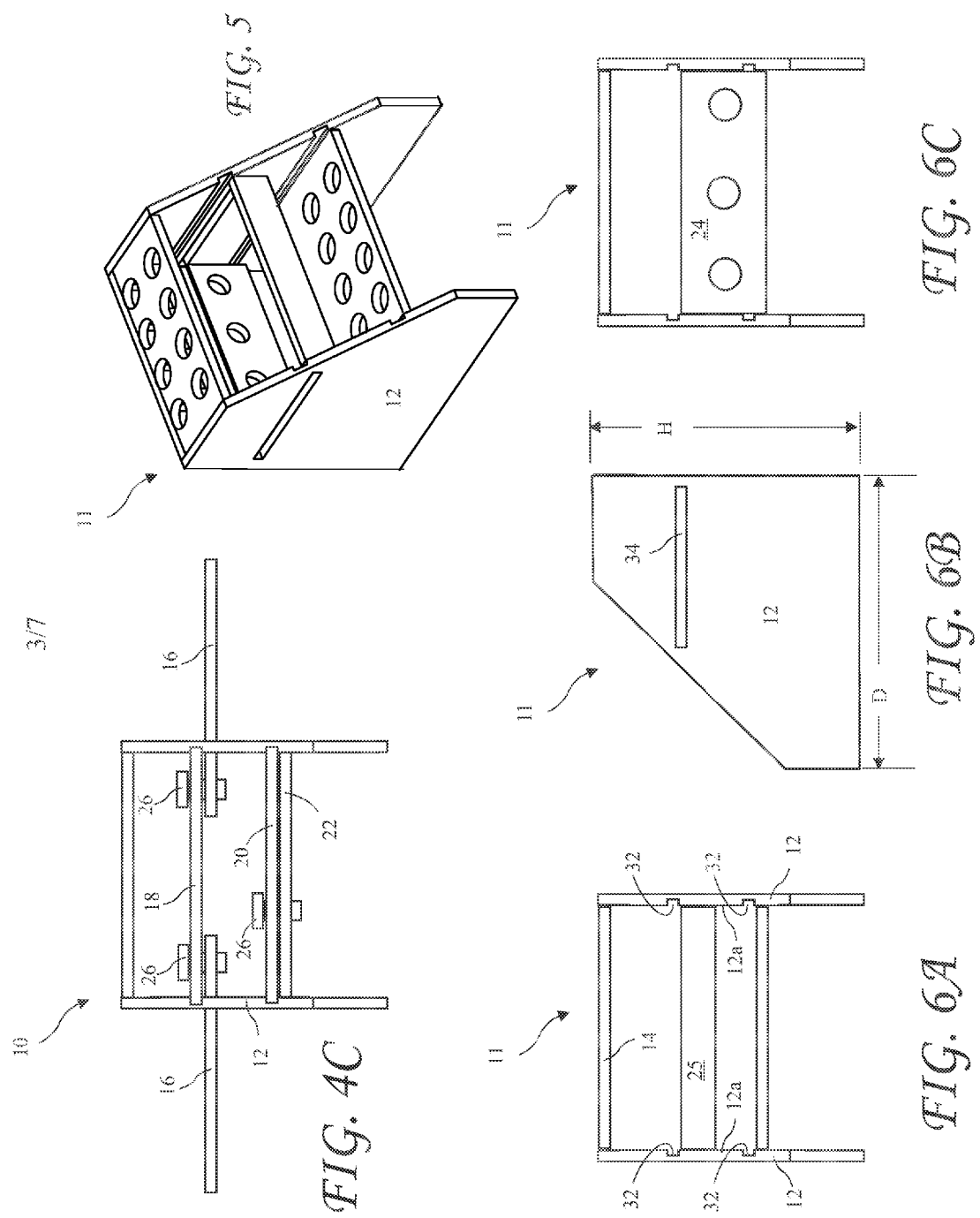

CORAL PROPAGATION HOLDER WITH ADJUSTABLE SHELVES

BACKGROUND OF THE INVENTION

The present invention relates to coral displays in aquariums and in particular to a display with adjustable shelves which may be fixed in a desired position.

Coral is often displayed in aquariums providing a colorful display of various natural shapes. Some aquarium owners collect a variety of different coral types and attach each to a common holder. Unfortunately when the aquarium owner desires to add to his display, he may reach a point where there is no additional room for added coral types.

BRIEF SUMMARY OF THE INVENTION

The present invention addresses the above and other needs by providing a coral holder which resides in an aquarium and includes shelves with holes which accept coral plugs. The coral plugs are small round tables with cylindrical stems extending down from the table. Hobbyist take adult size living corals and "frag" them (i.e., cut the mother colony and break off a small section) and glue the coral fragments to the coral plugs. The coral plugs are inserted into the holes on the shelves providing a coral display. The holder includes a center section, a fixed top shelf and adjustable shelves. The adjustable shelves extend out the sides and front of the center section and are adjustable allowing the aquarium owner to adjust the adjustable shelves accordingly to their needs (i.e., for the number of coral plugs). The positions of the shelves are fixed by inserting the coral plugs through the fixed top shelf and through the adjustable shelves.

In accordance with one aspect of the invention, there is provided a coral holder which taking advantage of a synergistic relationship between displaying coral attached to coral plugs, and using the plugs to secure adjustable shelves used to hold the plugs. A center section receives shelves inserted into slots and grooves. The shelves include an array of holes sized to receive coral plug posts reaching down from coral plug tables. The posts both position the coral plugs on the holder, and also engage the shelves to fix the shelf positions. When an aquarium owner desires to display additional coral, the coral plugs retaining the shelves can be removed, the shelves adjusted to provide additional position for coral, and the plugs repositioned to again engage and retain the shelves.

In accordance with another aspect of the invention, there is provided a coral holder which includes a center section, a fixed top shelf and adjustable shelves. The adjustable shelves extend out the sides and front of the center section and are adjustable allowing the aquarium owner to adjust the adjustable shelves accordingly to their needs (i.e., for the number of coral plugs).

In accordance with still another aspect of the invention, there is provided a coral holder which includes adjustable shelves which remain stationary in the center section after adjustment. The adjustable shelves are retained in the center section by lining up the holes in the adjustable shelves with holes in the fixed top shelf, and inserting a coral plug through both holes, the stem of coral plug providing a locking mechanism while still being utilized to hold a coral frag.

In accordance with yet another aspect of the invention, there is provided a coral holder which includes top shelf fixed to the center section and cannot be moved. The middle shelf and lower shelf are adjustable forward and rearward and the side shelves are laterally adjustable. An additional fixed bottom shelf may be provided and coral plugs may be inserted through the removable shelves and into the fixed bottom shelf to hold the moveable shelves in place.

In accordance with still another aspect of the invention, there is provided a coral holder which includes a fixed rear panel for bracing and holding two sides of the center section, and includes holes so water current is allowed to pass freely to prevent dead zones under the holder.

In accordance with another aspect of the invention, there is provided a coral holder which may rest on the floor of an aquarium, or may be held to an aquarium wall by sandwiching the aquarium wall between magnets. The magnetically retained embodiment includes the adjustable shelves and removable top shelf, but not necessarily the removable bottom shelf.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 2 is a coral plug according to the present invention.

FIG. 3 is a perspective view of the coral propagation holder showing the adjustable shelves retained by the coral plugs according to the present invention.

FIG. 4A is a side view of the coral propagation holder with adjustable shelves according to the present invention.

FIG. 4B is a front view of the coral propagation holder showing the adjustable shelves retained by the coral plugs according to the present invention.

FIG. 4C is a front view of the coral propagation holder showing the adjustable shelves moved outward and retained by the coral plugs according to the present invention.

FIG. 5 is a perspective view of a center section of the coral plug holder according to the present invention.

FIG. 6A is a front view of the center section of the coral plug holder according to the present invention.

FIG. 6B is a side view of the center section of the coral plug holder according to the present invention.

FIG. 6C is a rear view of the center section of the coral plug holder according to the present invention.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "generally" or "approximately" associated with an element of the invention, it is intended to describe a feature's appearance to the human eye, and not a precise measurement.

Where herein used to describe an element, the term "lateral" applies to left and right and the term "longitudinal" applies to front and back. The shelves described herein reside generally horizontally.

Figure 1A:
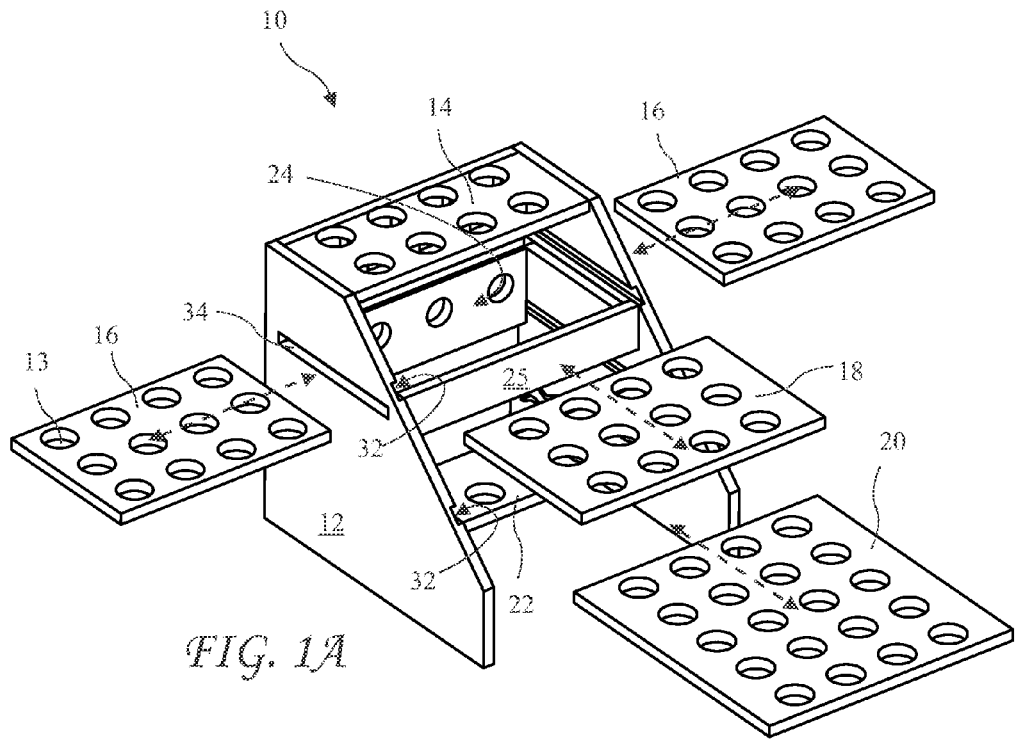
FIG. 1A is an exploded view of a coral propagation holder with adjustable shelves according to the present invention.
Figure 1B:
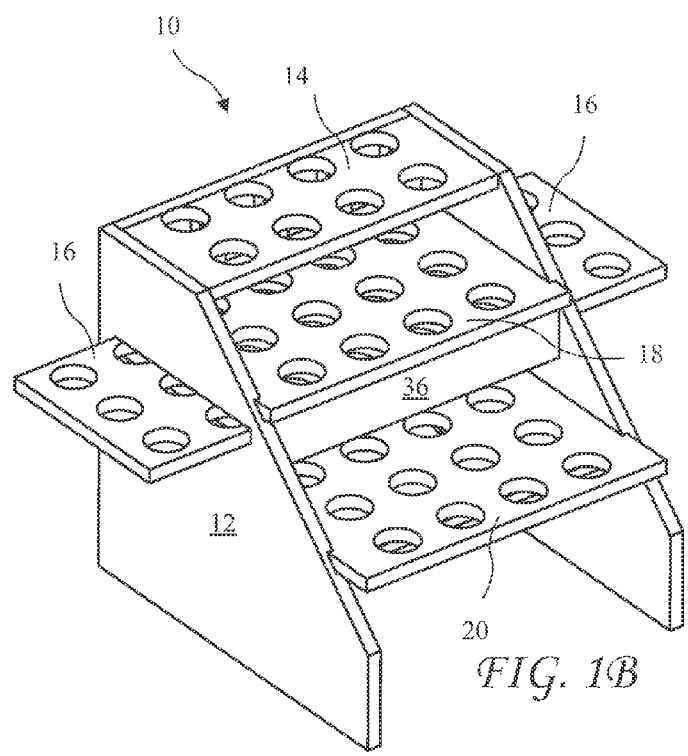
FIG. 1B is an assembled view of the coral propagation holder with adjustable shelves according to the present invention.

An exploded view of a coral propagation holder 10 with adjustable shelves according to the present invention is shown in FIG. 1A and assembled view of the coral propagation holder with adjustable shelves 10 is shown in FIG. 1B. The holder 10 includes a center section 11 (see FIG. 5), left and right sides 12, a fixed top shelf 14, right an left laterally adjustable shelves 16, a first (or upper) longitudinally adjustable (and non-laterally adjustable) shelf 18, a second (or lower) longitudinally adjustable (and non-laterally adjustable) shelf 20, a fixed lower shelf 22, a rear support 24, and a front support 25. The shelves 16 slide through slots 34 into the center section 11, and the shelves 18 and 20 slide in the grooves 32 into the center section 11. The shelves 16, 18, and 20 includes holes 13 for receiving coral plugs 26 (see FIG. 2).

A coral plug 26 is shown in FIG. 2. The coral plug 26 includes a small, preferably round, table 28 for attachment of a coral fragment, and a post 30 reaching down from the table 28. Common coral plugs 26 include cylindrical posts 30, but the post 30 may have other than a round cross-section. Hobbyist take adult size living corals and "frag" them (i.e., cut the mother colony and break off a small section) and glue the coral fragment to the coral plug 26. The coral plugs are inserted into the holes in coral holders providing a coral display in aquariums.

A perspective view of the holder 10 showing the adjustable shelves 16, 18, and 20 retained by the coral plugs 26 is shown in FIG. 3, a side view of the holder 10 with the adjustable shelves 16, 18, and 20 is shown in FIG. 4A, a front view of the holder 10 showing the adjustable shelves 16, 18, and 20 is shown in FIG. 4B, and is a front view of the holder 10 showing the adjustable shelves 16 moved outward and retained by the coral plugs 26. The adjustable shelves 16 reside under the adjustable shelf 18. Positions of the adjustable shelves 16 and 18 are adjusted to align holes 13 in the adjustable shelves 16 and 18 and one or more coral plugs 26 are inserted though overlapping holes 13 to hold the positions of the adjustable shelves 16 and 18.

Similarly, the adjustable shelf 20 resides above the fixed shelf 22 and the position of the adjustable shelf 20 is adjusted to align holes 13 in the adjustable shelf 20 and fixed shelf 22 and coral plugs are inserted though overlapping holes 13 to hold the positions of the adjustable shelf 20. The coral plugs 26 may be removed later allowing the positions of the adjustable shelves 16, 18, and 20 to be changes to provide additional positions for adding coral to the display.

A perspective view of the center section 11 of the holder is shown in FIG. 5, a front view of the center section 11 of the holder is shown in FIG. 6A, a side view of the center section 11 of the holder is shown in FIG. 6B, and a rear view of the center section 11 of the holder is shown in FIG. 6C. The center section 11 has a width W, a height H, and a depth D. In one embodiment, the width W is approximately five inches, the height H is approximately five inches, and the depth D is approximately five and one half inches. The back piece 24 is seen to have holes therethrough so water current is allowed to pass freely to prevent dead zones in the holder 10.

Figure 7:
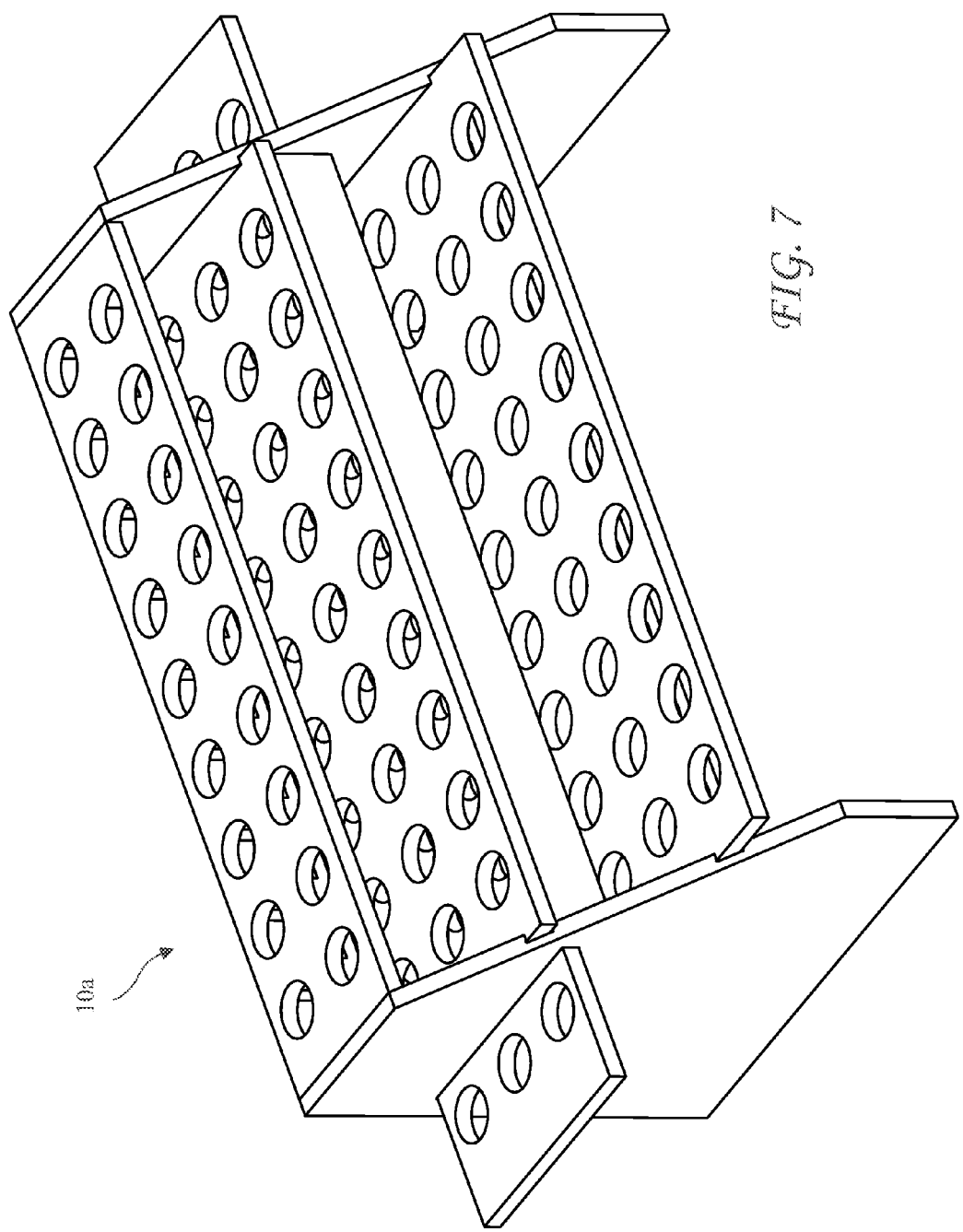
FIG. 7 is a perspective view of a larger embodiment of the coral plug holder according to the present invention.

The holder may be smaller or larger then the holder 10. A perspective view of a larger embodiment of the coral plug holder 10a is shown in FIG. 7. The holder 10a is wider than the holder 10, but is otherwise similar to the holder 10.

Figure 8A:
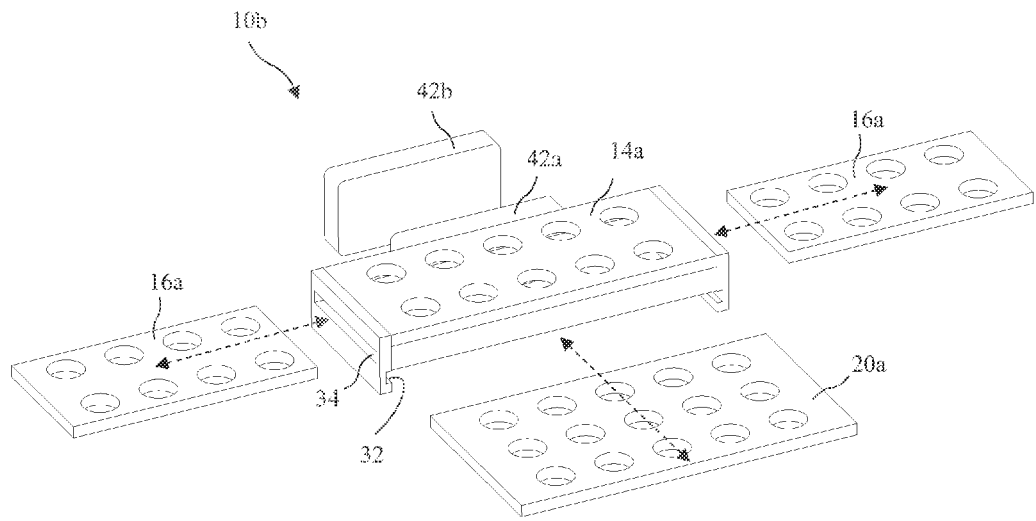
FIG. 8A is an exploded view of a magnetically held embodiment of the coral plug holder according to the present invention.
Figure 8B:
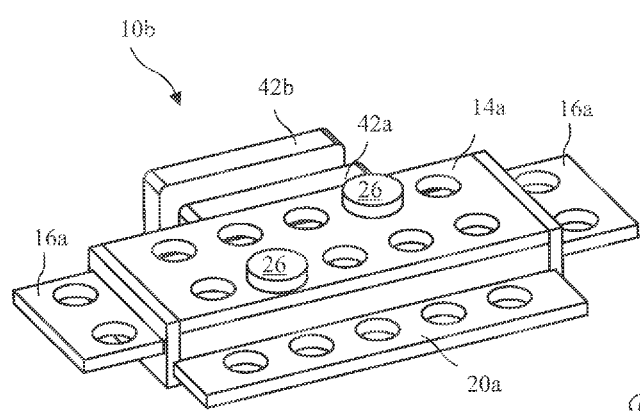
FIG. 8B is an assembled view of the magnetically held embodiment of the coral plug holder according to the present invention.

An exploded view of a magnetically held coral plug holder 10c is shown in FIG. 8A and is an assembled view of the 10c is shown in FIG. 8B. A first magnet 42a is fixed to the holder 10c, and a second magnet 42b may be positioned to sandwich an aquarium wall between the magnets 42a and 42b to hold the holder 10c in position on the holder wall. The holder 10c may include one or both of laterally adjustable shelves 16a and longitudinally adjustable shelf 20a. Coral plugs 16 may be inserted through a fixed top shelf 14a and through one or both of laterally adjustable shelves 16a and longitudinally adjustable shelf 20a to hold one or both of laterally adjustable shelves 16a and longitudinally adjustable shelf 20a in position, and allow adjustment as needed.

Figure 9:
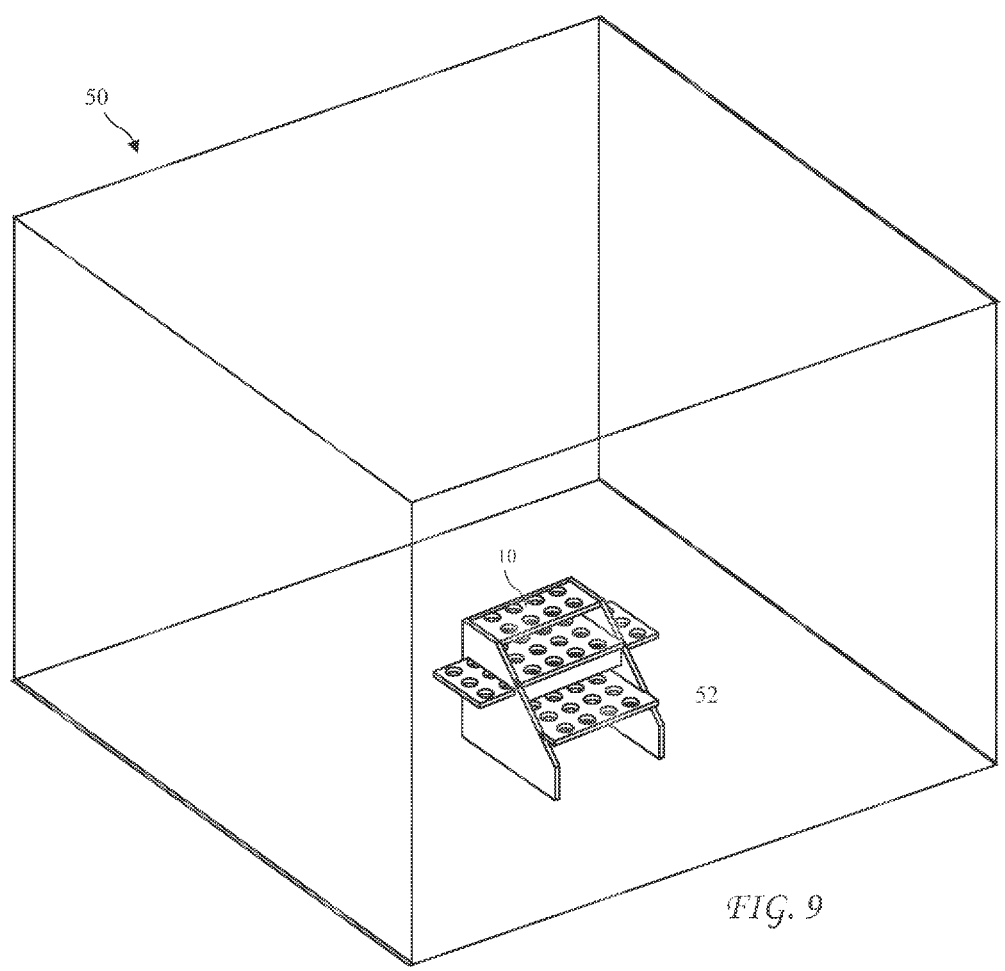
FIG. 9 shows the coral plug holder according to the present invention residing on the floor of an aquarium.
Figure 10:
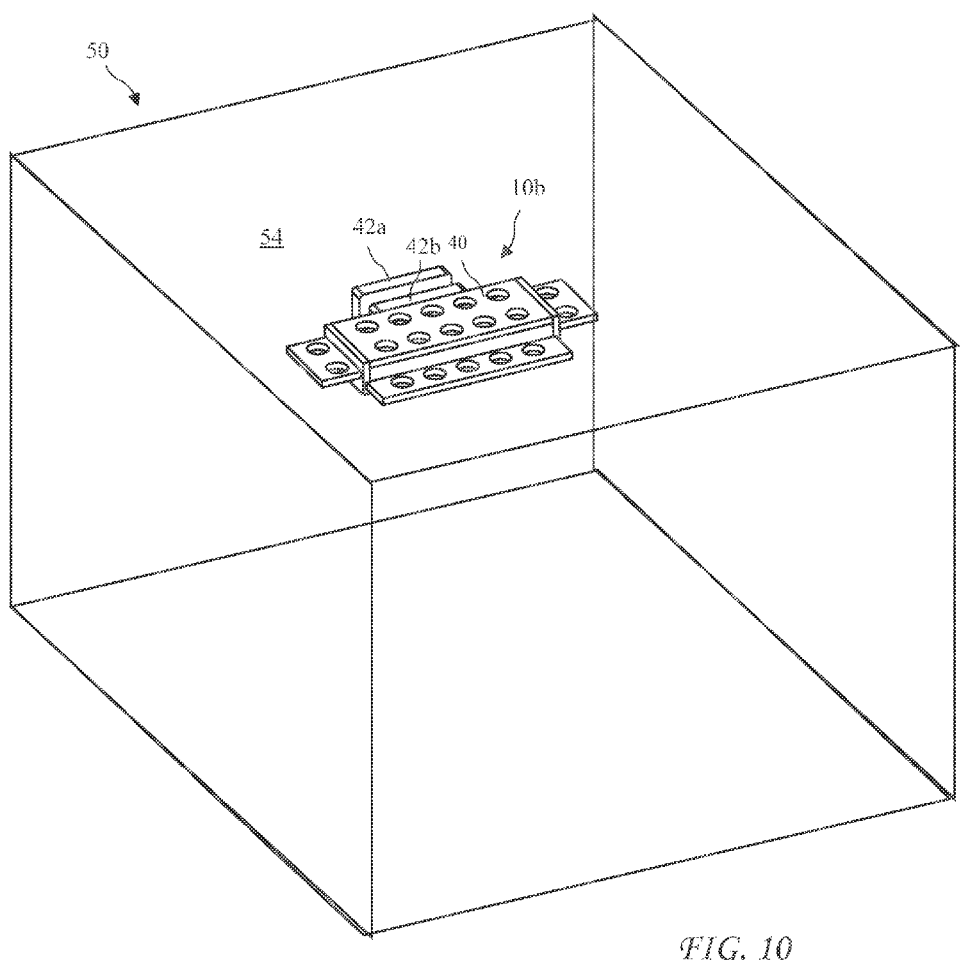
FIG. 10 shows the magnetically held coral plug holder according to the present invention held against a wall of the aquarium.

A holder 10 residing on the floor of an aquarium 50 is shown in FIG. 9 and the magnetically held holder 10b held against a wall 54 of the aquarium 50 is shown in FIG. 10.

While the invention herein disclosed has been described by means of specific embodiments and applications thereof, numerous modifications and variations could be made thereto by those skilled in the art without departing from the scope of the invention set forth in the claims.

I claim:
1. A coral holder comprising:
at least one coral plug comprising:
a generally horizontal table configured for attachment of a coral fragment; and
a post extending down from the table, the post having a smaller cross-section than the table;
a center section comprising:
fixed left and right sides;
generally horizontal slots through the left and right sides; and
at least one generally horizontal, fixed support connecting the left and right sides;
at least one generally horizontal, non-laterally adjustable shelf including a first array of first holes, each first hole configured for the post, but not the table, of the coral plug to pass therethrough, the non-laterally adjustable shelf comprising one of:
a fixed shelf; and
a longitudinally adjustable shelf;
at least one generally horizontal, laterally adjustable shelf insertable through the slots into the center section and including a second array of second holes, each second hole configured for the post, but not the table, of the coral plug to pass therethrough; and
the first array of holes and second array of holes arranged to allow the post to pass through the at least one laterally adjustable shelf and the at least one non-laterally adjustable shelves to fix the position of the at least one laterally adjustable shelf.
2. The coral holder of claim 1, wherein the non-laterally adjustable shelf is the fixed top shelf including the first array of first holes.

3. The coral holder of claim 2, further including the longitudinally adjustable shelf including a third array of third holes, each third hole configured for the post, but not the table, of the coral plug to pass therethrough, wherein the fixed top shelf, the at least one laterally adjustable shelf, and the longitudinally adjustable shelf are configured to allow the post to pass through the fixed shelf, the longitudinally adjustable shelf, and the at least one laterally adjustable shelf to fix the position of the longitudinally adjustable shelf and the at least one laterally adjustable shelf.

4. The coral holder of claim 3, further including a first magnet fixed to the back of the center section; and
   a second magnet configured to cooperate with the first magnet to sandwich an aquarium wall.

5. The coral holder of claim 1, comprising:
   the fixed shelf, wherein the fixed shelf resides at a top of the center section connecting the left and the right sides of the center section and including the first array of first holes; and further comprising
   the longitudinally adjustable shelf including a third array of third holes, each third hole configured for the post, but not the table, of the coral plug to pass therethrough.

6. The coral holder of claim 4, wherein the lateral and longitudinal spacing of the first array of first holes and second array of second holes is generally matching allowing more than one of the coral plugs to reside through the longitudinally adjustable shelf and the at least one laterally adjustable shelf at the same time.

7. The coral holder of claim 6, wherein the at least one laterally adjustable self comprises a left laterally adjustable self and right laterally adjustable self.

8. The coral holder of claim 1, further including:
   a fixed generally horizontal, fixed bottom shelf having a fourth array of fourth holes, each fourth hole configured for a post, but not a table, of a coral plug to pass therethrough; and
   a generally horizontal, longitudinally adjustable bottom shelf having a fifth array of fifth holes, each fifth hole configured for a post, but not a table, of a coral plug to pass therethrough, the lateral and longitudinal spacing of the fourth holes and fifth holes is generally matching allowing more than one of the coral plugs to reside through the fixed bottom shelf and the adjustable bottom shelf at the same time.

9. The coral holder of claim 1, further including a generally vertically residing back support attached to the right and left sides of the center section and including holes allowing water to pass therethrough.

10. A coral holder comprising:
   at least one coral plug comprising:
      a generally horizontal table configured for attachment of a coral fragment; and
      a post extending down from the table, the post having a smaller cross-section than the table;
   a center section comprising:
      fixed left and right sides;
      generally horizontal slots through the left and right sides;
      generally horizontal opposing grooves on inside walls of the right and left sides;
      a generally horizontal fixed top support connecting the left and right sides and including a first array of first holes, each first hole configured for the post, but not the table, of the coral plug to pass therethrough; and
      a first magnet fixed to the back of the center section;
   a second magnet configured to cooperate with the first magnet to sandwich an aquarium wall;
   a generally horizontal longitudinally adjustable shelf, the longitudinally adjustable shelf insertable into the opposing grooves in the walls of the center section and not laterally adjustable and including a second array of second holes, each second hole configured for the post, but not the table, of the coral plug to pass therethrough;
   two generally horizontal, laterally adjustable shelves insertable through the slots through the right and the left sides of the center section, and including a third array of third holes, each third hole configured for the post, but not the table, of the coral plug to pass therethrough; and
   the first array of first holes, the second array of second holes and second array of third holes arranged to allow the post to pass through the fixed top support, the longitudinally adjustable shelf, and the two laterally adjustable shelves to fix the positions of the longitudinally adjustable shelf and the laterally adjustable shelves.

11. A coral holder comprising:
   at least one coral plug comprising:
      a generally horizontal table configured for attachment of a coral fragment; and
      a post extending down from the table, the post having a smaller cross-section than the table;
   a center section comprising:
      fixed left and right sides;
      generally horizontal slots through the left and right sides;
      generally horizontal opposing first grooves on inside walls of the right and left sides;
      generally horizontal opposing second grooves below the first grooves on inside walls of the right and left sides; and
      a generally horizontal fixed top support connecting the left and right sides and including a first array of first holes, each first hole configured for the post, but not the table, of the coral plug to pass therethrough;
   a generally horizontal longitudinally adjustable shelf, the longitudinally adjustable shelf insertable into the opposing first grooves in the walls of the center section and not laterally adjustable and including a second array of second holes, each second hole configured for the post, but not the table, of the coral plug to pass therethrough;
   two generally horizontal, laterally adjustable shelves insertable through the slots through the right and the left sides of the center section, and including a third array of third holes, each third hole configured for the post, but not the table, of the coral plug to pass therethrough;
   the first array of first holes, the second array of second holes and second array of third holes arranged to allow the post to pass through the fixed top support, the longitudinally adjustable shelf, and the two laterally adjustable shelves to fix the positions of the longitudinally adjustable shelf and the laterally adjustable shelves;
   a generally horizontal, second longitudinally adjustable shelf, the second longitudinally adjustable shelf insertable into the opposing second grooves in the walls of the center section and not laterally adjustable and including a fourth array of fourth holes, each fourth hole configured for the post, but not the table, of the coral plug to pass therethrough;
   a generally horizontal lower fixed shelf residing proximal to the opposing second grooves and including a fifth array of fifth holes, each fifth hole configured for the post, but not the table, of the coral plug to pass therethrough; and the fourth array of fourth holes and fifth array of fifth holes arranged to allow the post to pass through the second longitudinally adjustable shelf and the fixed bottom support, to fix the position of the second longitudinally adjustable shelf.

\* \* \* \* \*